United States Patent
Galler et al.

[11] Patent Number: 5,991,720
[45] Date of Patent: Nov. 23, 1999

[54] SPEECH RECOGNITION SYSTEM EMPLOYING MULTIPLE GRAMMAR NETWORKS

[75] Inventors: Michael Galler; Jean-Claude Junqua, both of Santa Barbara, Calif.

[73] Assignee: Matsushita Electric Industrial Co., Ltd., Japan

[21] Appl. No.: 08/834,358

[22] Filed: Apr. 16, 1997

Related U.S. Application Data

[63] Continuation-in-part of application No. 08/642,766, May 6, 1996, Pat. No. 5,799,065.
[51] Int. Cl.$^6$ .............................. G01L 5/06; G01L 9/00; G01L 3/00
[52] U.S. Cl. .................... 704/256; 704/251; 704/275
[58] Field of Search .................... 704/256, 251, 704/275

[56] References Cited

U.S. PATENT DOCUMENTS

| | | | |
|---|---|---|---|
| 4,783,809 | 11/1988 | Glinski | 704/236 |
| 4,882,757 | 11/1989 | Fisher et al. | 704/255 |
| 5,467,425 | 11/1995 | Lau et al. | 704/252 |
| 5,649,057 | 7/1997 | Lee | 704/256 |
| 5,677,990 | 10/1997 | Junque | 704/256 |
| 5,787,230 | 7/1998 | Lee | 704/257 |

OTHER PUBLICATIONS

Rabiner, L.R. and Juang B–H, Fundamentals of Speech Recognition, AT&T, Prentice Hall, pp. 416–420; Jan. 1993.

*Primary Examiner*—David R. Hudspeth
*Assistant Examiner*—Robert Louis Sax
*Attorney, Agent, or Firm*—Harness, Dickey & Pierce P.L.C.

[57] ABSTRACT

The input speech is segmented using plural grammar networks, including a network that includes a filler model designed to represent noise or extraneous speech. Recognition processing results in plural lists of candidates, each list containing the N-best candidates generated. The lists are then separately aligned with the dictionary of valid names to generate two lists of valid names. The final recognition pass combines these two lists of names into a dynamic grammar and this dynamic grammar may be used to find the best candidate name using Viterbi recognition. A telephone call routing application based on the recognition system selects the best candidate name corresponding to the name spelled by the user, whether the user pronounces the name prior to spelling, or not.

21 Claims, 8 Drawing Sheets

SPEECH RECOGNITION SYSTEM EMPLOYING MULTIPLE GRAMMAR NETWORKS

CROSS REFERENCE TO RELATED APPLICATIONS

This is a continuation-in-part of U.S. patent application Ser. No. 08/642,766, filed May 6, 1996, entitled "Call Routing Device Employing Continuous Speech" by applicants Jean-Claude Junqua and Michael Galler now U.S. Pat. No. 5,799,065.

FIELD OF THE INVENTION

The present invention relates generally to computer-implemented speech recognition. More particularly, the invention relates to a method and apparatus of processing acoustic speech data using multiple grammar networks. Use of multiple networks results in different segmentation of the acoustic speech data, to facilitate extracting speech that has utility from speech that does not.

Although the invention has many uses, it is described here in a spelled name recognition system of the type suitable for telephone call routing applications. In the illustrated embodiment, first and second grammar networks are used to separately detect the N-best and M-best letter sequences. One grammar network is configured on the assumption that the user will immediately begin spelling in response to the system prompt. The second grammar network is configured on the assumption that the spelled name letter sequence begins with extraneous noise or utterances that are not recognized by the system. The N-best and M-best letter sequences are separately subjected to a dynamic programming match against a dictionary of valid names, to extract the N-best and M-best name hypotheses corresponding to each of the N-best and M-best letter sequences. The recognition decision is then made by selecting the best candidate from these sets of name hypotheses.

BACKGROUND AND SUMMARY OF THE INVENTION

Current speech recognition technology involves the recognition of patterns in acoustic data and the correlation of those patterns with a predetermined set of dictionary entries that are recognized by the system. The speech recognition problem is an extremely challenging one because there are so many different variants. In general, the speech recognizer applies the incoming acoustic data in digital form to a mathematical recognition process that converts the digital data into parameters based on a predefined model.

Conventionally, the model is one that has been previously trained using a sufficiently large training set so that individual speaker variances are largely abated. The model-based recognition process segments the incoming data into elemental components, such as phonemes, that are then labeled by comparison with the trained model. In one form of recognizer, once individual phonemes have been labeled, the phoneme data are compared with prestored words in the system dictionary. This comparison is performed through an alignment process that will accommodate imprecise matches due to incorrect phoneme recognition as well as insertion and deletion of phoneme within a given sequence. The system works on the basis of probabilities. Conventionally, the speech recognizer will select the most probable word candidate that results from the previously described segmentation, labeling and alignment process.

By their very nature, current speech recognizers select word candidates from the predefined dictionary and hence they will only recognize a predefined set of words. This raises a problem, particularly in systems where further decisions are made based on the results of speech recognition. Extraneous noise or speech utterances of words that are not found in the dictionary are often incorrectly interpreted as words that are found in the dictionary. Subsequent decisions based on such incorrect recognition can lead to faulty system performance.

To illustrate the problem, consider a spelled name telephone call routing application. The user is instructed by synthesized voice prompt to spell the name of the person to whom the call should be routed. If the user follows these instructions, the speech recognizer identifies each of the letters uttered and then is able to look up the spelled name by alignment of the sequence of letters with the dictionary. The system then routes the call to the appropriate extension using routing information found in the dictionary. However, if the user utters extraneous information first, such as by pronouncing the person's name prior to spelling, the recognition process is highly likely to fail. This is because the recognition system expects to receive only a sequence of uttered letters and will attempt to "recognize" the spoken name as one or more letters. The conventional system simply is not equipped to properly segment the incoming acoustic data, because the underlying model on which the system is built assumes a priori that the data are all equivalent units (spoken letters) that are useful or meaningful to the system.

The present invention solves the aforementioned problem through a speech recognition system that employs and integrates multiple grammar networks to generate multiple sets of recognition candidates, some based on a model that assumes the presence of extraneous speech, and some based on a model that assumes the absence of extraneous speech. The results of both models are used to make the ultimate recognition decision, relying on the respective match probability scores to select the most likely candidate.

According to one aspect of the invention, the acoustic speech data are separately processed using different first and second grammar networks that result in different segmentation of the acoustic speech data. In this way, the system will extract speech that has utility from speech that does not. For each grammar network, a plurality of recognition candidates are generated. The preferred embodiment generates the N-best candidates using a first grammar network and the M-best candidates using the a second grammar network, where N and M are integers greater than one and may be equal. The first and second plurality of recognition candidates (N-best, M-best) are transformed based on a least one set of a priori constraints about the speech that has utility. The transformation may comprise, for example, matching the candidates to a dictionary of spelled names that are recognized by the system. The recognition decision is then based on the transformed recognition candidates.

As will be more fully explained below, the invention splits the acoustic speech data into two or more paths that are each handled differently. One path is processed using a first grammar network based on the assumption that only useful utterances (e.g., letters) are supplied. Another path is processed using a different grammar network that assumes extraneous, nonuseful speech precedes the useful speech. The different grammar networks thus result in different segmentation of the data.

The recognition candidates generated by each path may each be scored according to how well each candidate matched the respective models. Rather than requiring the two paths to compete at this stage-in order to select the single candidate with the highest score-the two sets of recognition candidates are maintained separate. At this stage, the recognition candidates represent the N-best and M-best letter sequence hypotheses. To select which hypothesis is the best candidate, both sets are separately matched to the dictionary of all names that are recognized by the system.

The dictionary is, in effect, a collection of a priori constraints about the speech that will have utility to the system. Thus certain letter sequence hypotheses may be scored less probable because those letter sequences do not well match the letter sequences stored in the dictionary. The presently preferred embodiment uses the N-best and M-best letter sequences to select the N-best and M-best names from the dictionary. Thus contributions from both paths are included in the decision making process. Finally, the N-best and M-best sets of names may be combined to form a reduced set of dictionary candidates to which the input utterance is applied.

This reduced size dictionary can be used to build a dynamic grammar that is built from the N-best and M-best name candidates. This dynamic grammar will tend to favor one set of candidates or the other, depending on whether the input utterance contains extraneous speech or not. If extraneous speech is present, the grammar network designed to identify and reject the extraneous speech will tend to produce better recognition results, and those results will be reflected as the better candidates in the dynamic grammar that is constructed from the N-best and M-best name candidates. On the other hand, if no extraneous speech is present, the other grammar network will produce better recognition results, and it will be better reflected as the better candidates in the dynamic grammar.

Once the dynamic grammar is constructed, the input acoustic speech data may be processed using a recognizer based on the dynamic grammar to extract the single most probable name candidate as the recognized name. The recognized name is then used to access a suitable database for routing the telephone call appropriately.

For a more complete understanding of the invention, its objects and advantages, reference may be had to the following specification and to the accompanying drawings.

DESCRIPTION OF THE PREFERRED EMBODIMENT

The principles of the invention will be illustrated and described in the context of a call routing device that will prompt users to supply call routing information by verbally spelling names into the system. Therefore, to aid in understanding the speech recognition system, a brief description will first be provided of a call routing device in which the speech recognition system may be employed. It should be kept in mind, however, that the speech recognition system of the invention is not limited to call routing devices. Rather, the recognition system finds utility in a wide range of different applications where useful speech must be extracted from extraneous noise or speech that is not useful.

System Overview and Basic Operation

Figure 1:
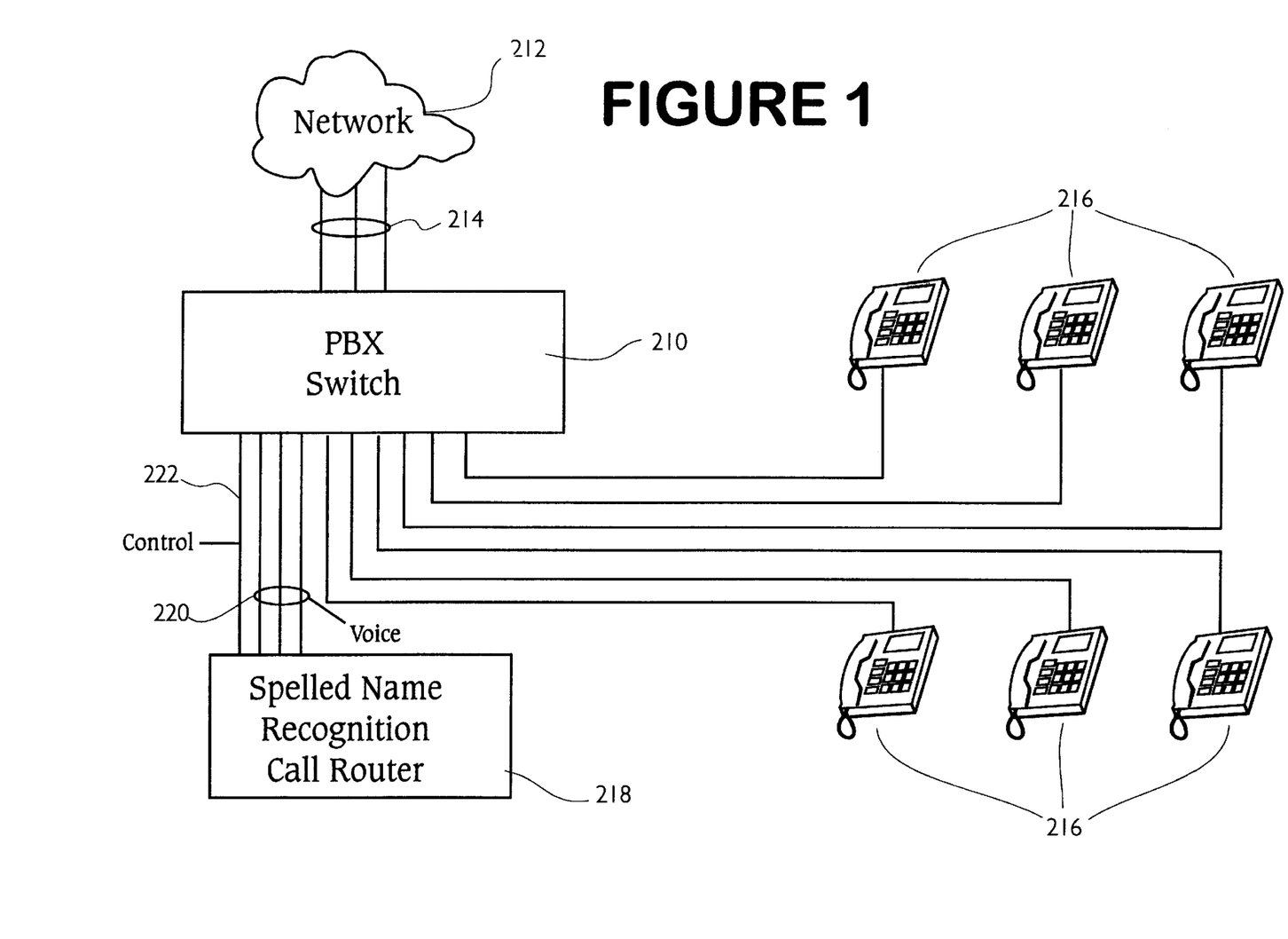
FIG. 1 is a block diagram of an exemplary system using the call routing device of the invention.

The call routing device employing continuous speech recognition will be illustrated in an exemplary embodiment, suitable for plug-and-play connection to an existing PBX switch, or for incorporation into the PBX equipment at the time of manufacture. Referring to FIG. 1, the PBX switch 210 is connected to the telephone network infrastructure 212 by conventional means such as telephone lines 214. In the illustrated embodiment three lines have been illustrated for convenience. This is not intended as a limitation of the invention as the invention is capable of being deployed in systems having a greater or fewer number of telephone lines.

The PBX switch is of conventional design, capable of routing incoming calls from network 212 to any of the selected telephone devices such as handsets 216. The spelled name recognition call router 218 of the invention is connected, as the handsets 216 are connected, to additional extensions or ports on the PBX switch 210. As will be more fully discussed, the presently preferred embodiment connects to the PBX switch through a plurality of lines 220 that carry voice traffic and through an additional line 222 that carries the control logic signals that allow the call router to work integrally with the existing PBX system.

Figure 2:
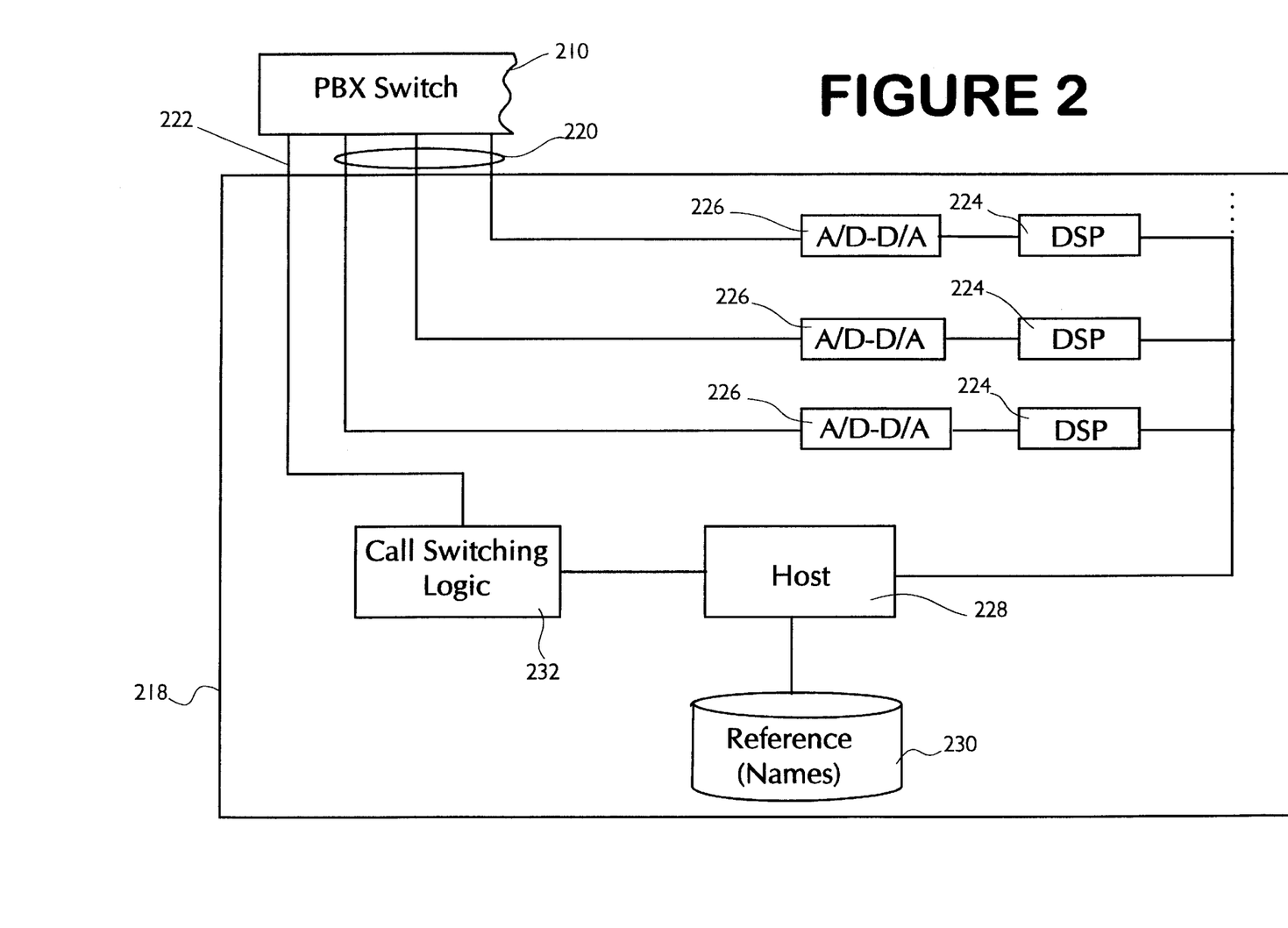
FIG. 2 is a block diagram of an exemplary embodiment of the call routing device of the invention.

FIG. 2 shows the call router 218 in greater detail. PBX switch 210 and lines 220 and 222 have also been illustrated. The call router 218 can be configured in a variety of different ways, depending on the architecture of the PBX system. In the illustrated embodiment the call router has three separate audio channels connected respectively to the three lines 220. Of course, the number of channels required will depend on the architecture of the telephone system. Three channels have been illustrated here to illustrate how a system may simultaneously provide spelled name recognition for three callers on each of the three incoming telephone lines 214. To support additional callers additional audio channels may be included or multiplexing circuitry may be included to allow channels to be shared.

Each of the audio channels has a digital signal processor (DSP) 224 and associated analog-to-digital/digital-to-analog conversion circuitry 226. The digital signal processors are coupled to the host processor 228 that includes a data store 230 in which all references or names are stored. Data store 230 may be any suitable digital storage medium such as random access memory. Data store 230 stores the continuous speech recognition dictionary of all names that can be recognized by the system, with the associated telephone exchange numbers. As will be explained more fully below, the preferred embodiment uses a special speech recognizer that is optimized for speaker-independent recognition of continuously spelled names.

Also coupled to host processor 228 (or incorporated as part of the host processor) is the call switching logic 232. This switching logic connects to the signal line 222 and communicates with the PBX switching system, following the communication protocols dictated by the PBX switch.

Before proceeding with a detailed explanation of the speech recognizer, a brief explanation of the operation of the call router 218 may be helpful. Referring to FIGS. 1 and 2, when an incoming call reaches the PBX switch through one of the telephone lines 214, it may be handled by a human operator without intervention by the call router of the invention. However, if the human operator is not able to handle the call (for example, the call comes in after normal business hours when there is no human operator), the PBX switch is programmed to forward the call to the call router 218. The switch does this by simply assigning the call to one of the audio channels of the call router (to one of the lines 220), based on switching instructions sent on line 222. If desired, the PBX switch can be programmed to jump to a different signal line on a different audio channel within the router 218 if the first line is busy. Having done this, the incoming call is now in communication with a selected one of the DSP processors 224. The processor supplies any required voice prompts to the incoming caller (requesting the caller to spell the name of the desired person) and it also processes the caller's spelled name response. The details of the speech recognition algorithm used by DSP processors 224 will be described below.

As part of the recognition process, the DSP processor 224 downloads from the host 228 a copy of the shared speech recognition resources, namely the data reflecting all reference names and their associated telephone extension numbers. Using an N-best strategy for real-time recognition the DSP-implemented speech recognizer selects the most probable candidate from data store 230. The name of this candidate is spoken back to the caller using the DSP processor to supply a speech synthesized signal or to playback a prerecorded audio signal rendition of the selected person's name. The caller is then asked to respond "yes" or "no," indicating whether the candidate is the correct one. If it is, the host processor 228 uses the call switching logic 232 to instruct the PBX switch to transfer the call from one of the lines 220 to a selected one of the handsets 216. After this switching has occurred, the call router's audio channel is once again free to handle a new incoming call.

Details of Preferred Speech Recognition Processing

Figure 5:
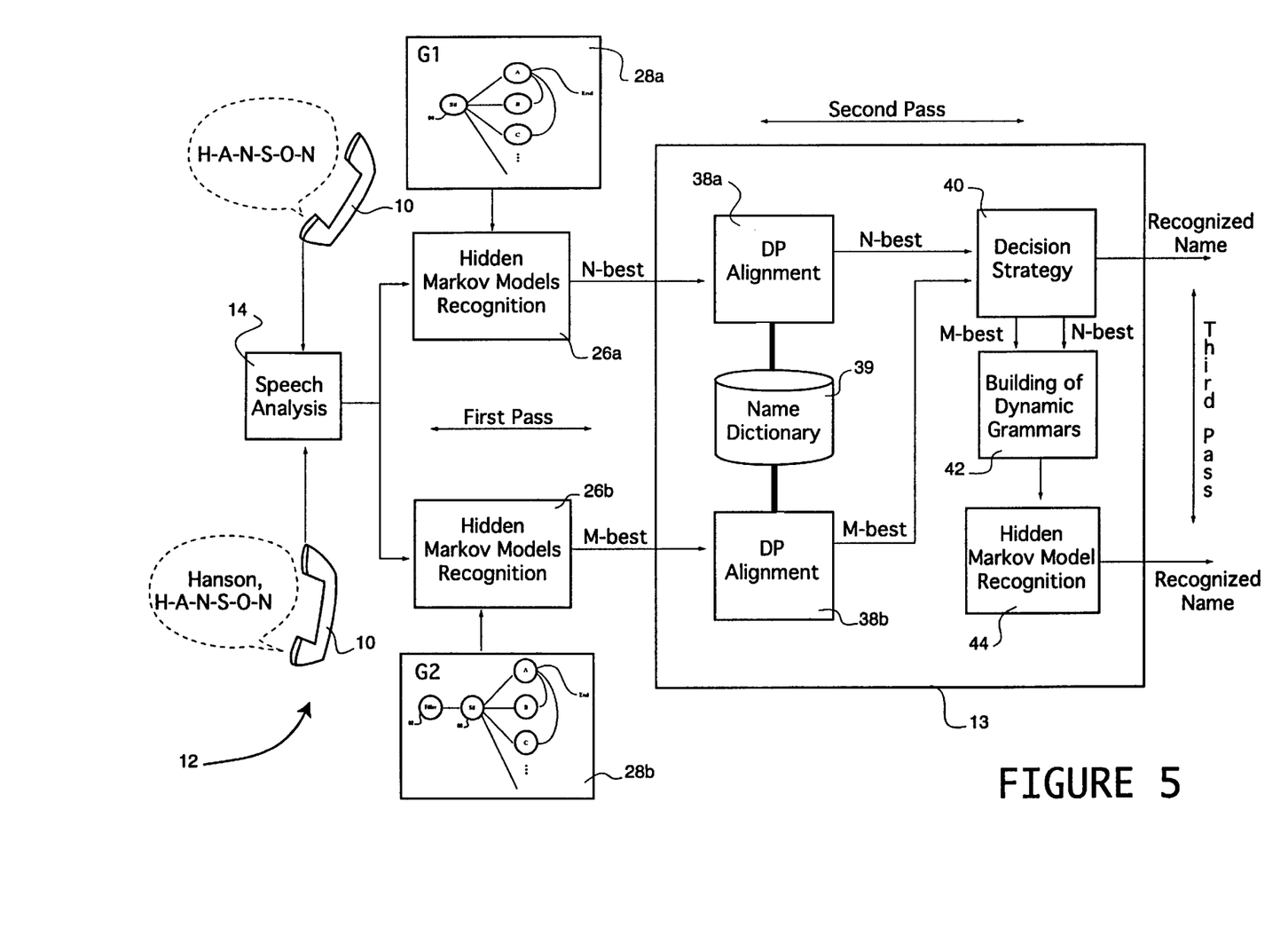
FIG. 5 is a detailed block diagram of the presently preferred recognition system of the invention.

The presently preferred speech recognition system may be viewed as a multipass procedure, with the final pass being used only if the preceding (alignment) pass does not produce a single recognized name as output. The first and final passes employ Hidden Markov Model recognition, while the alignment pass employs dynamic programming alignment with the dictionary. As will be more fully discussed, the first pass (Hidden Markov Models recognition) is, itself, split into plural parallel subpaths. In FIG. 5, the first, second and third passes are illustrated. Note that the first pass bifurcated through separate Hidden Markov Models recognition blocks 26a and 26b.

The illustrated embodiment is designed to recognize continuously spelled names comprising a sequence of letters that are supplied to the recognition system as input through a caller's telephone handset 10. To illustrate examples of useful and nonuseful input, two handsets 10 have been illustrated. Into one handset the caller has correctly used the system by supplying the sequence of letters: H-A-N-S-O-N. Into the other handset, the caller has incorrectly used the system, by uttering the spoken name and then following with a sequence of letters: "Hanson" H-A-N-S-O-N. As will be described below, the system is designed to accommodate both correct usage and incorrect usage, resulting in a more robust recognition system.

The recognition system, shown generally at 12 includes a name retrieval system shown generally at 13. As will be discussed, the name retrieval system has the ability to construct dynamic grammars representing a selected subset of entries found in the name dictionary. The dynamic grammars are used in the event recognition is not accomplished in the second pass and processing proceeds to the third pass.

Figure 6:
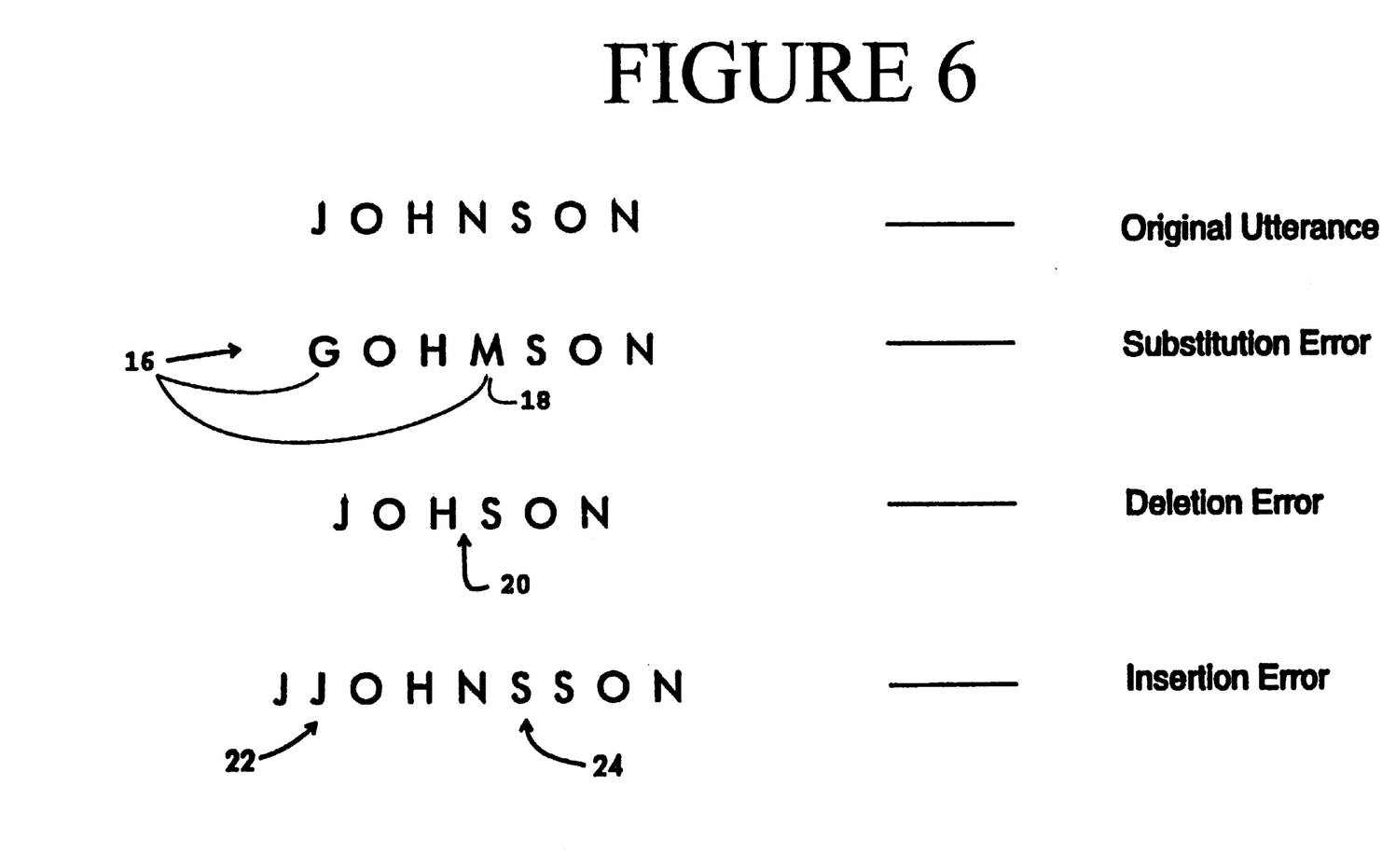
FIG. 6 is a diagram illustrating different types of recognition errors.

The input sequence of letters may be fed to a suitable speech analysis module 14. This module performs front end optimization designed to decrease the number of substitution, deletion and insertion errors. In a continuously spelled name a substitution error is the substitution of an incorrect letter for the correct one. FIG. 6 illustrates at 16 and 18 examples of substitution errors made in the recognition of the spelled name JOHNSON. A deletion error is the omission of one or more letters from the continuously spelled name. This is illustrated at 20 in FIG. 6. An insertion error is the inclusion of additional letters not originally uttered in the continuously spelled name. An example of an insertion error is shown at 22 and 24 in FIG. 6.

The speech analysis module 14 is designed to operate on digitized speech data. Thus if an analog speech input system is used, the analog signal should first be digitized. This may be done by suitable analog-to-digital circuitry that may be included in the speech analysis module 14.

The presently preferred speech analysis module uses an 8th-order PLP-RASTA process to compensate for the effect of the communication channel. For more information regarding the PLP-RASTA compensation, see H. Hermansky, N. Morgan, A. Bayya and P. Kohn, EUROSPEECH '91, pages 1367–1370, 1991. The presently preferred embodiment uses a 10 millisecond frame shift and a 20 millisecond analysis window. The RASTA filter coefficient is optimized to decrease the number of substitution, deletion and insertion errors. The best filter coefficient compromise is selected for a value of 0.90.

Figure 7:
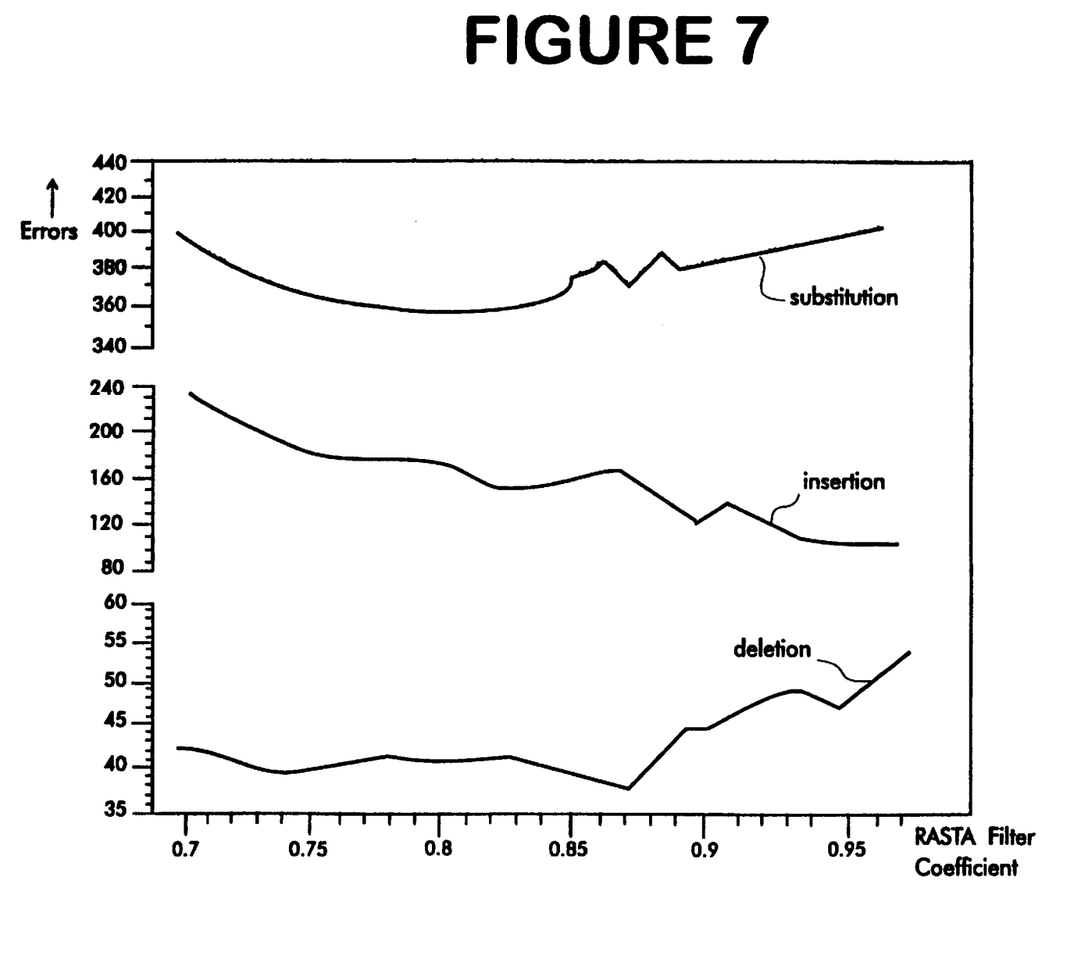
FIG. 7 is a graph showing optimization of the PLP-RASTA filter coefficients to decrease the number of substitution, deletion and insertion errors.

In determining the optimized RASTA filter coefficients, the energy, the first derivative of the energy and the first derivative of the static cepstral coefficients $C_1$ through $C_8$ (computed over 7 frames) are alternatively combined with the static cepstral coefficients to form the speech parametric representation (a total of 18 coefficients). FIG. 7 illustrates the optimized RASTA filter coefficients that will decrease the number of substitution, deletion and insertion errors. In this figure PLP-RASTA stands for the combination of energy, the first derivative of energy, static cepstral coefficients and first derivative of static cepstral coefficients.

While the PLP-RASTA optimization is presently preferred, other forms of optimization may also be used. For example, a mel frequency cepstrum coefficient (MFCC) analysis may alternatively be used. Suitable results can be obtained using a 14th-order MFCC analysis. For the MFCC analysis, 11 static cepstral coefficients ($C_0$ included) are computed with a frame shift of 16 milliseconds and an analysis window of 32 milliseconds.

Different recognition accuracy may be obtained using different feature sets. These feature sets may include static features and dynamic features separately and combined. To illustrate the robustness of the parameterization used in the invention, clean as well as filtered data were used. To obtain filtered data for the test set in the presently preferred embodiment, a distorting filter is used and the test data is filtered to artificially create a mismatch between the training set and the test set. In this regard, see H. Murveit, J. Butzberger and M. Weintraub. In Darpa *Workshop Speech and Natural Language*, pages 280–284, February 1992.

Figure 3:
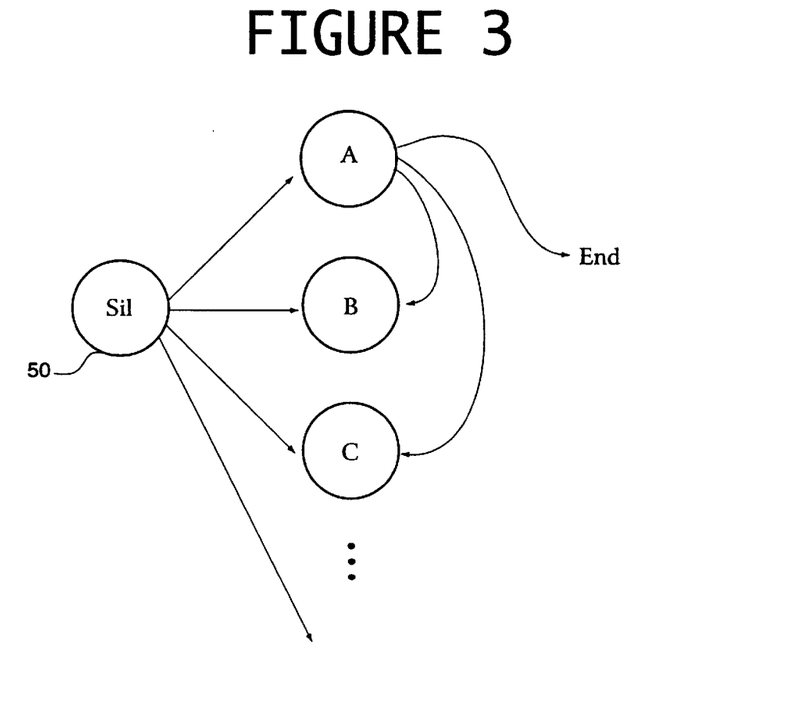
FIG. 3 is state diagram illustrating the grammar network G1, configured on the assumption that the spelled name letter sequence begins with valid letters.
Figure 4:
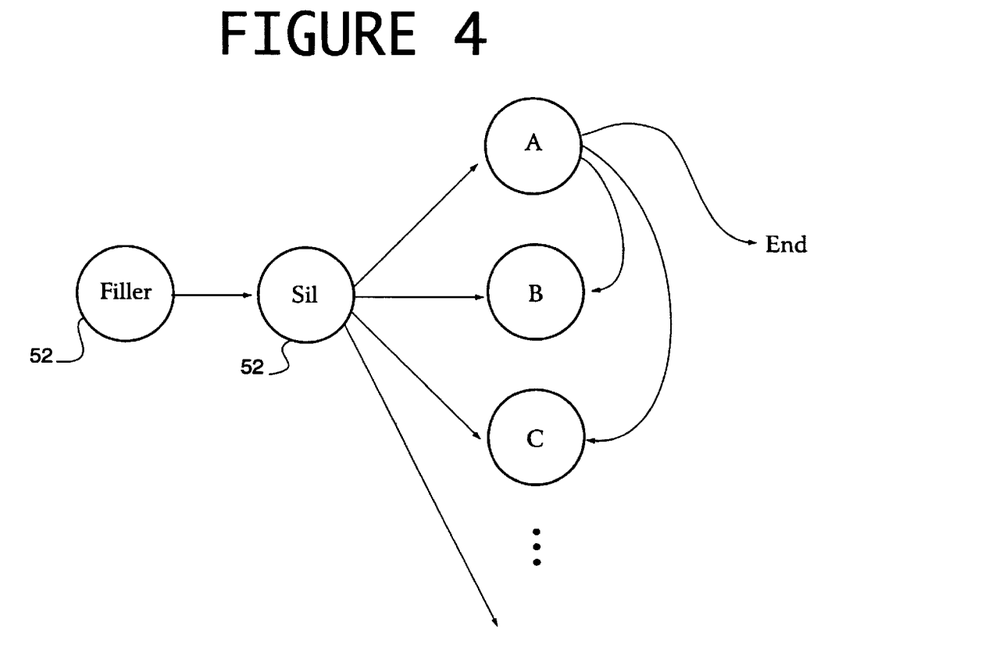
FIG. 4 is a state diagram illustrating the grammar network G2 configured on the assumption that the spelled name letter sequence begins with extraneous noise or utterances that are not recognized by the system.

Returning to FIG. 5, the output from speech analysis module 14, is split into two paths, one associated with Hidden Markov Models recognition block 26a and one associated with Hidden Markov Models recognition block 26b. Recognition block 26a works with a pre-defined letter grammar G1, depicted diagrammatically at 28a. Recognition 26b works with a different letter grammar G2 depicted diagrammatically at 28b. These different letter grammars are constructed as grammar networks illustrated in FIGS. 3 and 4, respectively. These grammar networks are graphs comprising nodes associated with each of the possible letters and what node-to-node transitions are possible. The grammars both include a silence node followed by letter loops, where any letter may follow any letter. Grammar G1 of FIG. 3 begins with a silence (Sil) node 50, transitioning to individual starting letters A, B, C . . . Grammar G2, depicted in FIG. 4, begins with a filler node 52 to represent extraneous speech or noise spoken prior to spelling. The filler node transitions to silence node 52 and then to the individual letter nodes as G1. In the presently preferred implementation, recognition blocks 26a and 26b are frame-synchronous, first order, continuous density Hidden Markov Model recognizers employing Viterbi decoding.

The presently preferred embodiment employs a modified Viterbi decoder that yields the N-best or M-best hypotheses (instead of a single hypothesis). Usually the Viterbi decoder is designed to provide only the best hypothesis, based on probability of a match between HMM models and the test utterance. This standard Viterbi decoder is modified for use in the invention so that it provides the N-best or M-best hypotheses, based on the highest probabilities of a match between HMM models and the test utterance. Recognition blocks 26a and 26b each generate their own N-best or M-best hypotheses. If desired, these two recognition blocks need not generate the same number of hypotheses, although in the preferred embodiment the same number is used (e.g., N=M=10). Thus in FIG. 5, recognition block 26a yields the N-best hypotheses and recognition block 26b yields the M-best hypotheses. As previously noted, the symbols N and M may be any integer greater than 1. The precise value chosen for integers N and M may depend on the speed of the processor and on the memory size. The techniques for generating the N-best (or M-best) letter candidates will be discussed more fully below. It will be understood that the techniques for generating the N-best (or M-best) hypotheses are essentially the same for both cases.

The Hidden Markov Model recognizers employed at 26a and 26b are provided with beam search capability designed to limit the search space, so that the recognizer will process the incoming speech more quickly. The Hidden Markov Model recognizer produces a score that represents the likelihood of a match between input speech and reference speech. Without the beam search mechanism, the recognizer must score all possible paths at each frame during the search process. With beam search the recognizer considers only those paths whose scores that deviate from the best score no more than an amount equal to the beam width. Rather than searching the entire search space, a beam search is implemented whereby the least likely search paths are pruned, such that only the best hypotheses are returned.

The N-best (or M-best) hypotheses resulting from the recognizers 26a and 26b are then passed to dynamic programming (DP) alignment modules 38a and 38b, respectively. The dynamic programming alignment modules have access to an associated name dictionary 39 against which the N-best (or M-best) hypotheses are compared. Dynamic programming is used to account for insertion, substitution and deletion errors.

In some instances, the result of dynamic programming alignment will produce a single name with no other candidates. Decision strategy module 40 detects this and provides the recognized name as the output, when there is only one candidate resulting from the DP alignment. In most cases, however, a single candidate does not result, in which case the decision strategy module passes the N-best and M-best hypotheses to module 42 for building a dynamic grammar.

Module 42 builds a grammar using the N-best and M-best candidates provided by the DP alignment modules. The highly constrained recognizer 44 is then invoked to evaluate the N-best and M-best candidates using the dynamic grammar 42. The recognizer 44 may also be a Hidden Markov Model recognizer. Even though highly constrained, the data pass through this recognizer is not time-consuming because the dynamic grammar is small and because the parametric representation (computed in 14) need not be recomputed. If desired, a neural network discriminator can be applied at the output of recognizers 26a and 26b or recognizer 44.

The listing in the Appendix A shows how the system of the invention performs in recognizing the spelled name WILSON. In the listing the section designated [First Pass] shows all hypotheses produced by both grammars. None of these is the name WILSON.

In the section labeled [DP Alignment] the top candidates have been listed; included in the list is the name WILSON (candidate 1 of 10).

In the section labeled [Costly Constrained Pass] the input utterance is compared with only the candidates selected during DP Alignment. In this case, the recognizer correctly detects the name WILSON.

N-Best Processing Techniques

The N-best or M-best candidates are chosen using an N-best selection algorithm. For details regarding this technique, see R. Schwartz and Steve Austin, "Efficient, High Performance Algorithms for N-Best Search," DARPA Workshop on Speech Recognition, pp. 6–11, 1990. In speech recognition, the incoming speech data are broken up into time frames and analyzed on a frame-by-frame basis. For any given utterance, there may be several possible hypotheses. The presently preferred N-best (or M-best) algorithm selects the best starting time for a letter based only on the preceding letter and not on letters before the preceding letter. As each letter is spoken and analyzed, the Hidden Markov Model recognizer will generate probability scores for each of the models. Because the objective of the system is ultimately to select the most probable sequence of letters, the system stores a plurality of paths, representing possible spelled combinations of letters.

To make the system work better as a real time recognizer, two different levels of data pruning are implemented. The pruning technique at both levels involves comparing the probability of a given hypothesis to a probability threshold. If the probability of a given path is below the threshold, it is discarded. More specifically, pruning occurs at a local level and at a global level. Local level pruning involves discarding those paths that represent low probability matches on the letter level; and global pruning involves discarding those paths that represent low probability matches from the beginning of the utterance to the last letter found. Thus, at the end of the spelled name, a recursive traceback is performed to extract the N-best (or M-best) name hypotheses. When the traceback operation is performed, the local and global pruning has already reduced the size of the memory space that needs to be analyzed.

In addition to local and global pruning, the presently preferred system may also use an adaptive threshold whereby the pruning threshold is adjusted dynamically as the system runs.

In the case of confusable words, the recognizer uses state tying to help focus on the discriminative part of the word and to decrease the number of estimated parameters. The tied letters are (m, n), (i, r), (p, t) and (b, d). In the presently preferred embodiment all letters except the letter W are represented by a six state HMM model. The letter W is represented by a twelve state HMM model and the silence model is represented by one state. Letter models have different numbers of Gaussian densities, depending on how confusable the letters are. The "E-set" letters: b, c, d, e, g, p, t, v and z, as well as the letters m, n, s and f are all modeled with 6 Gaussian densities. The remaining letters are modeled with three Gaussian densities.

Figure 8:
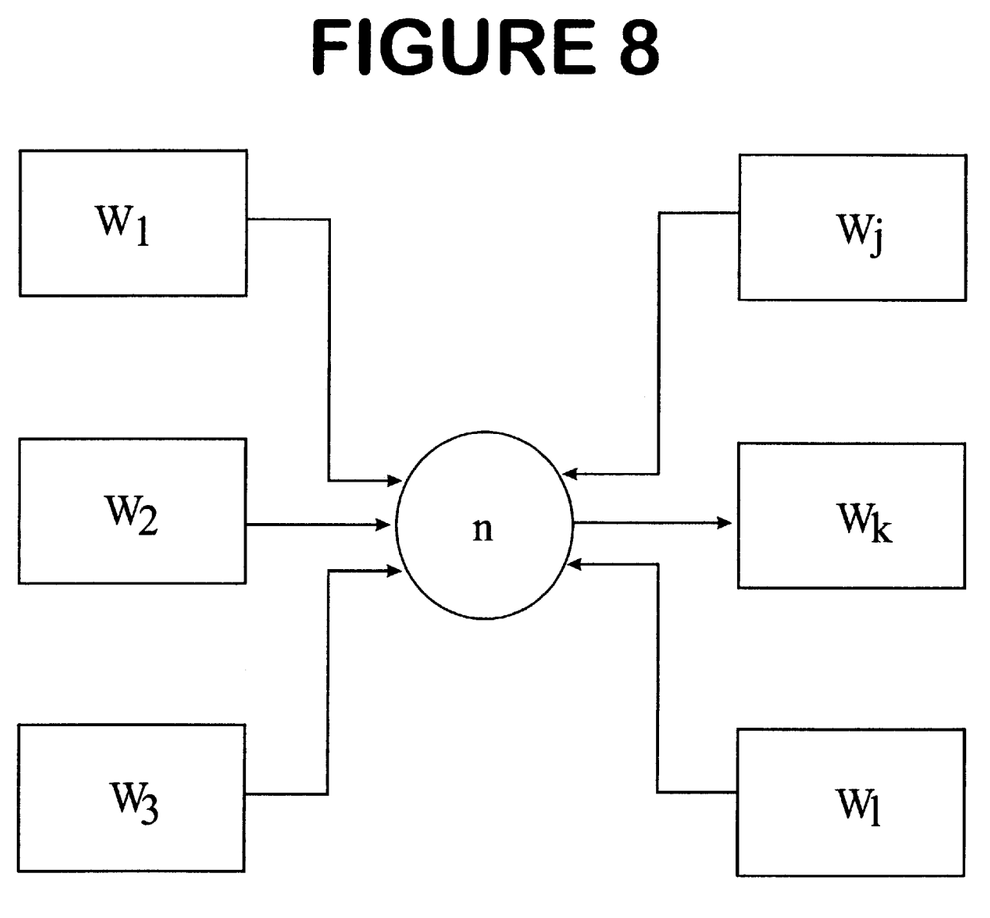
FIG. 8 is a diagram showing the improved lattice N-best technique.

FIG. 8 illustrates another, presently preferred, technique for performing the N-best (or M-best) hypotheses analysis. Referred to here as the lattice N-best technique, at each frame the procedure computes the likelihood for each grammar node and saves the best responses coming to that node. It then stores the probability along with the number of frames that hypothesis has been active. The technique thus retains N-best (or M-best) hypothesis and propagates the best one through the node, all others are subsumed by the maximum likelihood path.

The Viterbi forward algorithm computes the probability for each state. This is done frame-by-frame upon all data in the input buffer, with the probabilities being stored in a State data structure. The presently preferred lattice N-best technique is a modified Viterbi algorithm that produces the N-best (or M-best) candidates, but propagates in the next model only the maximum likelihood. Thus at each frame, the routine computes the likelihood for each grammar node and then saves the best responses coming into that node.

Referring to FIG. 8, a network node n is depicted. Three hypotheses $W_1$, $W_2$ and $W_3$ enter node n. Of these hypotheses only the maximum likelihood (highest probability) is carried forward. Thus node n generates the next word hypotheses $W_J$, $W_k$ and $W_l$, based on the maximum likelihood from node n. The Viterbi forward algorithm stores the probability, the duration (the number of frames that the current hypothesis has been active) and a pointer to each hypothesis that generated the particular network node. This information is used by the backtracking algorithm when the probability data in the State data structure is analyzed.

Figure 9:
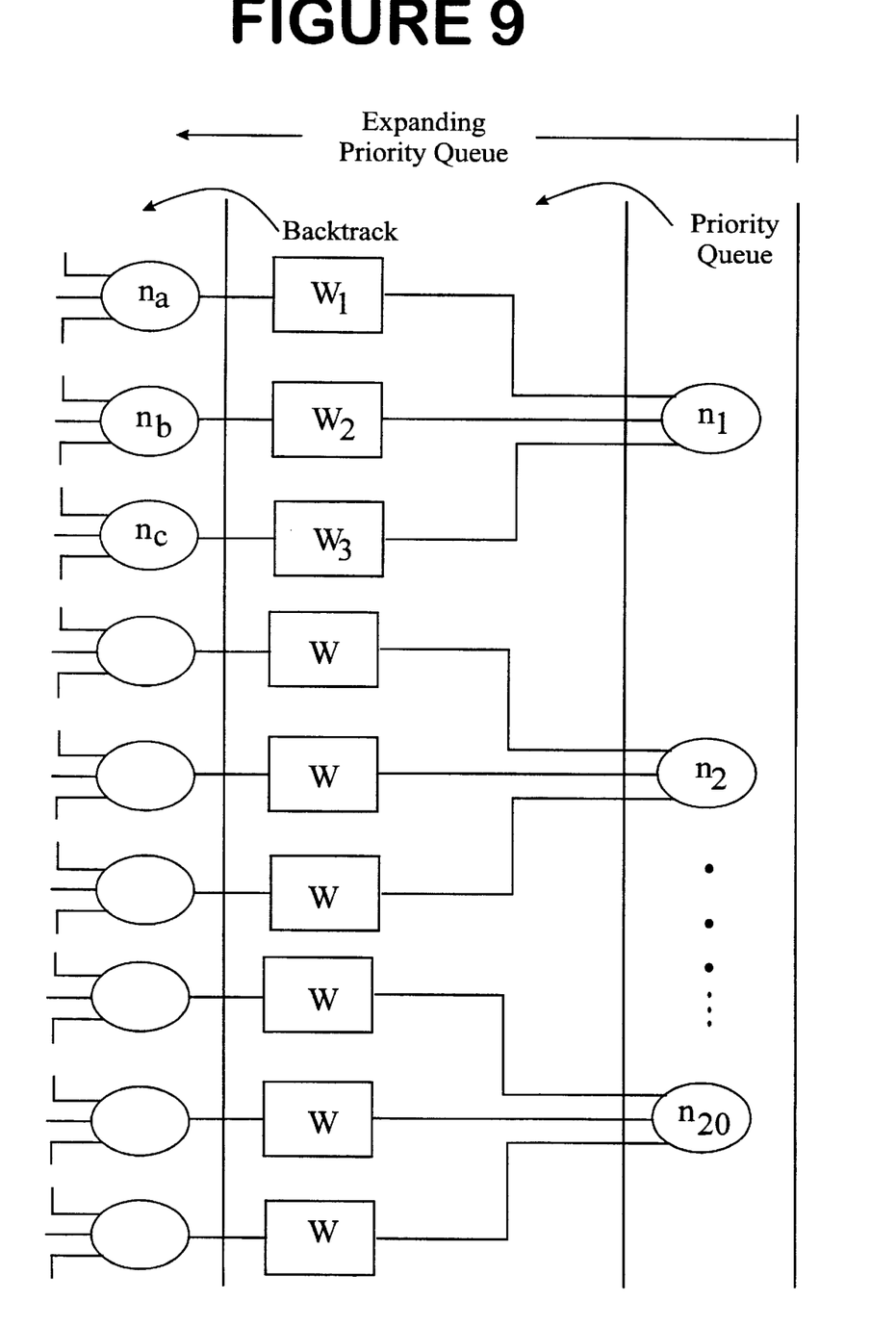
FIG. 9 is a diagram further describing how hypotheses generation is performed during the backtracking phase of recognition.

The backtracking algorithm may be understood with reference to FIG. 9. The presently preferred backtracking algorithm prioritizes all of the N-best ending nodes into a priority queue, illustrated in FIG. 16 as the vertical column 280. If, for example, during the first pass 10 hypotheses are propagated in the last frame (N=10), then there will be 10 ending nodes ($n_1$, $n_2$ . . . , $n_{10}$) in priority queue 280. The ending nodes are sorted in descending order, such that the first ending node in the queue represents the one with the highest probability score.

In FIG. 9 assume for purposes of illustration that node $n_1$ is the node with the highest score. That node is expanded by backtracking one step to locate the hypothesis ($W_1$, $W_2$ or $W_3$) that generated the given node $n_1$. Identifying this hypothesis in turn allows the backtracking routine to identify the node that generated the identified hypothesis. In FIG. 16, if hypothesis $W_2$ was responsible for generating node $n_1$, then node $n_b$ is identified through backtracking. Node $n_b$ is then substituted for node $n_1$ in some place in priority queue 280. After substitution, the priority queue remains sorted in descending order. If the newly substituted node $n_b$ happens to have the highest score, then it will occupy the place previously occupied by node $n_1$. Of course, it is also possible that one of the other nodes in the priority queue will have a higher score than the newly substituted node $n_b$. In this case the node with the highest score, and not the newly substituted node $n_b$, will be used in the next backtracking operation.

Backtracking proceeds in the manner described above until a starting node (a node corresponding to the first frame of speech) is encountered during backtracking. When a starting node is reached a hypothesis has been found. The backtracking algorithm saves each of the symbols encountered as backtracking is performed. These symbols may be saved as a string that may be read back in reverse order to generate the most likely candidate names.

FIG. 9 has illustrated the general case where there are multiple N-best hypotheses (N=10). To further illustrate the priority queue backtracking procedure see the example presented in Appendix B. The example shows the backtracking procedure for the name "JONES."

From the foregoing it will now be appreciated that the call routing device of the invention is well adapted for plug-compatible connection to virtually any office telephone network or PBX system. The routing device employs a sophisticated speaker-independent, continuous speech recognition technique that allows an incoming caller to spell the desired recipient's name and the system will automatically determine the proper telephone extension for the intended recipient and cause the existing telephone network or PBX system to connect the incoming caller to the recipient's extension. The invention eliminates the need to communicate with the telephone network through cumbersome touch-tone commands, making the system well-suited for the visually impaired. The speech recognition technique is highly flexible; incoming callers may spell at their own natural speaking rate and the system will automatically prompt the user to confirm the name selection after the caller quits speaking. The system will automatically resume speech recognition if the incoming caller pauses briefly and then continues spelling. The multipass speech recognition procedure performs well even over noisy telephone channels. The procedure propagates the N-best hypotheses between passes and defers the more computationally costly procedures until the final pass, at which time the candidate list of possible names has been greatly reduced. As a consequence of the N-best, multipass recognition process, the invention can be implemented using low cost DSP circuitry.

While the invention has been described in its presently preferred form, it will be understood that certain modifications can be made without departing from the spirit of the appended claims. Thus, for example, different configurations may be envisioned to connect with different types of present-day and future telephone systems, including both analog systems and digital systems.

APPENDIX A

FIRST PASS

G1 grammar:

Hypothesis 1: ocfeylson
Hypothesis 2: onseylson
G2 grammar:

Letters spotted at frame 104.
Hypothesis 1: wylson
DICTIONARY ALIGNMENT PASS

N-best candidates from G1:

Candidate 1 of 8: neilson
Candidate 2 of 8: masterson
Candidate 3 of 8: nielson
Candidate 4 of 8: anderson
Candidate 5 of 8: carlson
Candidate 6 of 8: nelson
Candidate 7 of 8: anderson
Candidate 8 of 8: patterson
M-best candidates from G2:

Candidate 1 of 10: wilson
Candidate 2 of 10: walton
Candidate 3 of 10: wasson
Candidate 4 of 10: watson
Candidate 5 of 10: nelson
Candidate 6 of 10: folsom
Candidate 7 of 10: urmson
Candidate 8 of 10: bylsma
Candidate 9 of 10: olson
Candidate 10 of 10: sisson
COSTLY CONSTRAINED PASS

Hypothesis 1: wilson
310 frames (3.1 seconds) in signal.

---

Appendix B
Example of Priority-Queue Backtrack Procedure for "JONES"
Last Frame Number 10; Three Hypothesis Nodes Saved 1. node 6 (s)   2. node 6 (r)    3. node 4 (d)
   prob 0.9        prob 0.8          prob 0.6
   duration 18 frames  duration 20 frames  duration 12 frames
   prev. node 3    prev. node 3      prev. node 2
   frame #100      frame #100        frame #100

Build Priority Queue: (Order of <u>Decreasing</u> Probability):

Exand Maximum Likelihood Node, Extending Sequence Backward:

node 3 (e)
prob. 0.9 (prob. of parent)
duration 10
prev. node 1
frame: 100-18=82 node 2 (a)
prob. 0.7 prob. of parent (0.9)
duration 10
prev. node 8
frame: 100-18=82

Insert New Hypothesis Node in Priority Queue:

---

Appendix B
Example of Priority-Queue Backtrack Procedure for "JONES"

[3] "es", 82 → 6 "r", 100 → 2 "as", 82 → 4 "d", 100

(Children Replace Parent Node in Queue)
Begin Procedure TackTrack
{ Initialize backtrack priority-queue Q }
For each grammar-terminal state S
Begin
  If S has active list h1, h2, ..., hn of hypotheses in final frame T
  Begin
    For each ative hypothesis h
    Begin
      generate node N
      N.score <- h.score
      N.sequence <- h.symbol
      N.duration <- h.duration
      N.predecessor <- h.predecessor
      N.time <- T
      enqueue N in Q
    End For
  End If
End For
{ Process priority-queue Q, generating
  n-best sequences. }
NumSequences <- 0
While Queue nonempty and NumSequences < n
Begin
  Dequeue first (top-scoring) node N from Q
  If N's predecessor is grammar-initial state
  Begin
    send N.sequence to output
    NumSequences <- NumSequence + 1
  End If
  { Expand N to generate child nodes.
    Add child nodes to priority queue Q }
  T <- N.time - N.duration
  S <- N.predecessor
  For each active hypothesis h for state S in frame T
  Begin
    generate node C
    C.score <- N.score - (best score for S in frame T - h.score)
    C.sequence <- concatenation of h.symbol and N.sequence
    C.duration <- h.duration
    C.predecessor <- h.predecessor
    C.time <- T
    enqueue C in Q
  End For
End While
End Procedure BackTrack

---

What is claimed is:

1. A single pass method of processing acoustic speech data for word recognition, comprising:
processing said acoustic speech data using a recognizer based on a first grammar model to segment said acoustic speech data in a first way and thereby extract a first plurality of recognition candidates;
processing said acoustic speech data using a recognizer based on a second grammar model different that said first grammar model to segment said acoustic speech data in a second way different than said first way and thereby extract a second plurality of recognition candidates;
aligning said first plurality of recognition candidates with a dictionary of predetermined words to generate a first list of word candidates;
aligning said second plurality of recognition candidates with said dictionary of predetermined words to generate a second list of word candidates;
building a dynamic grammar model from said first and second lists of word candidates; and processing said acoustic speech data using a recognizer based on said dynamic grammar model to extract the recognized word.

2. The method of claim 1 wherein said first and second grammar models are network models comprising a plurality of interconnected letter models.

3. The method of claim 2 wherein said letter models are represented by Hidden Markov Models.

4. The method of claim 2 wherein said first and second grammar models are network models comprising a plurality of interconnected letter models and said second grammar model includes at least one filler model to represent utterances not defined by said letter models.

5. The method of claim 2 wherein said first and second grammar models are network models comprising a plurality of interconnected letter models and said second grammar model includes at least one filler model to represent utterances not defined by said letter models and one silence model to represent a pause in said acoustic speech data.

6. The method of claim 1 wherein said second grammar model defines a letter spotting grammar.

7. The method of claim 1 wherein said first and second grammar models comprise a plurality of different nodes and wherein said first and second plurality of recognition candidates are extracted by a recognition process that scores said nodes according to how closely said acoustic speech data matches said nodes; and wherein said first and second plurality of recognition candidates are extracted by selecting those nodes scored as having the closest match to said acoustic data.

8. The method of claim 1 wherein said second grammar model comprises at least one node for representing noise.

9. The method of claim 1 further comprising using said recognized word to route a telephone call.

10. A single pass method of processing acoustic speech data for spelled name recognition, comprising:

processing said acoustic speech data using a recognizer based on a first grammar model to segment said acoustic speech data in a first way and thereby extract a first plurality of letter candidates;

processing said acoustic speech data using a recognizer based on a second grammar model to segment said acoustic speech data in a second way different than said first way and thereby extract a second plurality of letter candidates;

aligning said first plurality of letter candidates with a dictionary of predetermined names to generate a first list of name candidates;

aligning said second plurality of recognition candidates with said dictionary of predetermined words to generate a second list of name candidates; and processing said acoustic speech data using a recognizer based on said dynamic grammar model to extract the recognized name.

11. The method of claim 10 wherein said first and second grammar models are different.

12. The method of claim 10 wherein said first and second grammar models are network models comprising a plurality of interconnected letter models.

13. The method of claim 12 wherein said letter models are represented by Hidden Markov Models.

14. The method of claim 10 wherein said first and second grammar models are network models comprising a plurality of interconnected letter models and said second grammar model includes at least one filler model to represent utterances not defined by said letter models.

15. The method of claim 10 wherein said first and second grammar models are network models comprising a plurality of interconnected letter models and said second grammar model includes at least one filler model to represent utterances not defined by said letter models and one silence model to represent a pause in said acoustic speech data.

16. The method of claim 10 wherein said second grammar model defines a letter spotting grammar.

17. The method of claim 10 wherein said first and second grammar models comprise a plurality of different nodes and wherein said first and second plurality of recognition candidates are extracted by a recognition process that scores said nodes according to how closely said acoustic speech data matches said nodes; and wherein said first and second plurality of recognition candidates are extracted by selecting those nodes scored as having the closest match to said acoustic data.

18. The method of claim 17 wherein said second grammar model comprises at least one node for representing noise.

19. The method of claim 10 further comprising using said recognized word to route a telephone call.

20. A single pass method of processing acoustic speech data for recognition, comprising:

processing said acoustic speech data using a recognizer based on a first grammar network to segment said acoustic speech data in a first way and thereby extract a first plurality of recognition candidates according to a first speech input criteria;

processing said acoustic speech data using a recognizer based on a second grammar network to segment said acoustic speech data on a second way different than said first way and thereby extract a second plurality of recognition candidates according to a second speech input criteria;

transforming said first and second plurality of recognition candidates into transformed candidates based on at least one set of a priori constraints on said acoustic speech data;

making recognition decision based on said transformed candidates.

21. A single pass method of processing acoustic speech data for recognition, comprising:

separately processing said acoustic speech data using different first and second grammar networks that result in different segmentation of said acoustic speech data to extract speech that has utility from speech that does not;

generating a first plurality of recognition candidates using said first grammar network and a second plurality of recognition candidates using said second grammar network;

transforming said first and second plurality of recognition candidates based on at least one set of a priori constraints about the speech that has utility to generate transformed recognition candidates; and making a recognition decision based on said transformed recognition candidates.

* * * * *